(12) United States Patent
Kreikemeier et al.

(10) Patent No.: US 7,003,357 B1
(45) Date of Patent: Feb. 21, 2006

(54) METHOD AND MEANS FOR READING THE STATUS OF AND CONTROLLING IRRIGATION COMPONENTS

(75) Inventors: Bruce Kreikemeier, West Point, NE (US); Marv Schulz, Omaha, NE (US); Craig Malsam, Omaha, NE (US)

(73) Assignee: Valmont Industries, Inc., Valley, NE (US)

( * ) Notice: Subject to any disclaimer, the term of this patent is extended or adjusted under 35 U.S.C. 154(b) by 466 days.

(21) Appl. No.: 10/187,925

(22) Filed: Jul. 1, 2002

Related U.S. Application Data (63) Continuation-in-part of application No. 09/778,367, filed on Feb. 7, 2001, now Pat. No. 6,853,883.

(51) Int. Cl.
G05B 11/01 (2006.01)

(52) U.S. Cl. ............................ 700/17; 700/83; 700/19; 700/65; 700/264; 700/284; 702/188; 340/31; 340/39; 340/371

(58) Field of Classification Search ................... 700/17, 700/83, 19, 65, 264, 284; 702/188; 340/31, 340/39, 371
See application file for complete search history.

(56) References Cited

U.S. PATENT DOCUMENTS

| | | | |
|---|---|---|---|
| 4,626,984 A * | 12/1986 | Unruh et al. ................... | 700/3 |
| 5,651,500 A | 7/1997 | Patterson et al. | |
| 5,699,244 A | 12/1997 | Clark, Jr. et al. | |
| 5,760,706 A * | 6/1998 | Kiss ........................ | 340/825.69 |
| 5,892,758 A * | 4/1999 | Argyroudis .................. | 370/335 |
| 5,921,280 A | 7/1999 | Ericksen et al. | |
| 6,064,943 A * | 5/2000 | Clark et al. ..................... | 702/2 |
| 6,088,621 A * | 7/2000 | Woytowitz et al. ........... | 700/16 |
| 6,108,590 A | 8/2000 | Hergert | |
| 6,337,971 B1 * | 1/2002 | Abts .......................... | 340/7.2 |
| 6,343,255 B1 * | 1/2002 | Peek et al. ..................... | 702/3 |
| 6,747,571 B1 * | 6/2004 | Fierro et al. ........... | 340/870.02 |

OTHER PUBLICATIONS

Alves-Serodio et al. "An integrated Network for Agricultural Management Applications" Jul. 1998, IEEE International Symposium, vol. 2 pp 679-683.*

* cited by examiner

Primary Examiner—Wilbert L. Starks, Jr.
Assistant Examiner—Thomas Pham
(74) Attorney, Agent, or Firm—Thomte, Mazour & Niebergall; Shane M. Niebergall (57) ABSTRACT

A method and means is disclosed for remotely reading the status of and controlling irrigation components and ancillary equipment. A handheld remote user interface (RUI) is provided which includes at least a display. The RUI has the ability to communicate with and control the irrigation components using built-in wireless telemetry technology. The RUI allows the user to read the status of and control the irrigation components and ancillary equipment from any location, without requiring the user to be at the irrigation component controls or at a specific location in the field. Software operational of the RUI generates one or more user screens with graphic user interfaces for quickly and easily monitoring and controlling the irrigation components and ancillary equipment.

18 Claims, 8 Drawing Sheets

METHOD AND MEANS FOR READING THE STATUS OF AND CONTROLLING IRRIGATION COMPONENTS

CROSS-REFERENCE TO RELATED APPLICATION

This is a continuation-in-part application of Petitioner's earlier application Ser. No. 09/778,367 filed Feb. 7, 2001, now U.S. Pat. No. 6,853,883, entitled METHOD AND MEANS FOR READING THE STATUS OF AND CONTROLLING IRRIGATION COMPONENTS.

BACKGROUND OF THE INVENTION

1. Field of the Invention

This invention relates to a method and means for reading the status of and remotely controlling irrigation components and ancillary equipment including, but not limited to, center pivots, linears, drip sectors, pumps, engine generators, valves, pressure sensors, etc., by means of a remote, handheld controller.

2. Description of the Related Art

Devices have been previously provided for the remote control of irrigation systems and components thereof. One prior art device for remotely controlling irrigation systems is the base station control. The base station control utilizes RF telemetry or cell phone telemetry to read the status of and control irrigation components from a personal computer (PC). The disadvantage of this method is that the user needs to be at the PC. Situations arise whereby after viewing the operation of the irrigation components, immediate action is needed. The base station control system requires the user to go back to the PC, which may be located miles away, for remote control capability.

A second type of system is known as the remote mount control panel system. Remote mount control panels consist of mounting the control panels of the components at a location in the field away from the components to thereby provide relatively easy access to the control panels. This requires burying the power and control wires in the field. This method also limits access to the control panels to one particular location, that being the location of the remote mounted control panel.

SUMMARY OF THE INVENTION

A method and means is disclosed for reading the status of and remotely controlling irrigation components and ancillary equipment. The means for remotely reading the status of and controlling irrigation components and ancillary equipment comprises a remote user interface (RUI) which is a separate unit from the irrigation component controller. The RUI consists of a handheld display and an optional keypad. The RUI has the ability to communicate with and control the irrigation components using built-in wireless telemetry technology. The RUI allows the user to read the status of, communicate with, and control irrigation components from any location, without requiring the user to be at the irrigation component controls or at a specific location in the field. The method of this invention enables a person to determine the status of irrigation components and ancillary equipment and to control the operation thereof, which comprises the steps of: (1) providing a handheld wireless RUI; (2) utilizing the RUI to read the status of the irrigation components and ancillary equipment; and (3) utilizing the RUI to communicate with the irrigation components and ancillary equipment for controlling the operation thereof.

It is therefore a principal object of the invention to provide a method and means for remotely reading the status of and controlling irrigation components and ancillary equipment by means of a remote user interface (RUI).

Still another object of the invention is to provide a remote user interface for irrigation components which is a separate unit from the irrigation component controller.

Still another object of the invention is to provide a remote user interface for irrigation components which consists of a handheld display and keypad having the ability to communicate with the irrigation components and control the same through the use of built-in wireless telemetry technology.

Still another object of the invention is to provide a remote user interface for irrigation components which consists of software that is operative on the remote user interface to generate a plurality of distinct graphic user interfaces on a display that 1 represent the status of different components within the irrigation system.

Still another object of the invention is to provide a remote user interface for irrigation components which consists of software that is operative on the remote user interface to generate a plurality of distinct graphic user interfaces on a display that receive commands from the user for controlling the irrigation system.

Still another object of the invention is to provide a remote user interface for irrigation components which consists of software that is operative on the remote user interface to generate a plurality of graphic user interfaces on a display that can be quickly and easily read.

Still another object of the invention is to provide a remote user interface for irrigation components which consists of software that is operative on the remote user interface to generate a plurality of graphic user interfaces on a single display page, which will provide the user with comprehensive information on the status of the irrigation system.

Still another object of the invention is to provide a method and means for remotely controlling irrigation components and ancillary equipment which allows the user to read the status of, communicate with, and control irrigation components from remote locations without requiring the user to be at the irrigation component controls or at a specific location in the field.

These and other objects will be apparent to those skilled in the art.

DESCRIPTION OF THE PREFERRED EMBODIMENT

In the drawings, the numerals 10 and 12 refer to irrigation components such as center pivot irrigation systems including ancillary equipment 13. The method and means of this invention is used to control irrigation components and ancillary equipment which may be center pivots, linear systems, drip sectors, pumps, engine generators, 1 valves, pressure sensors, etc.

Figure 1:
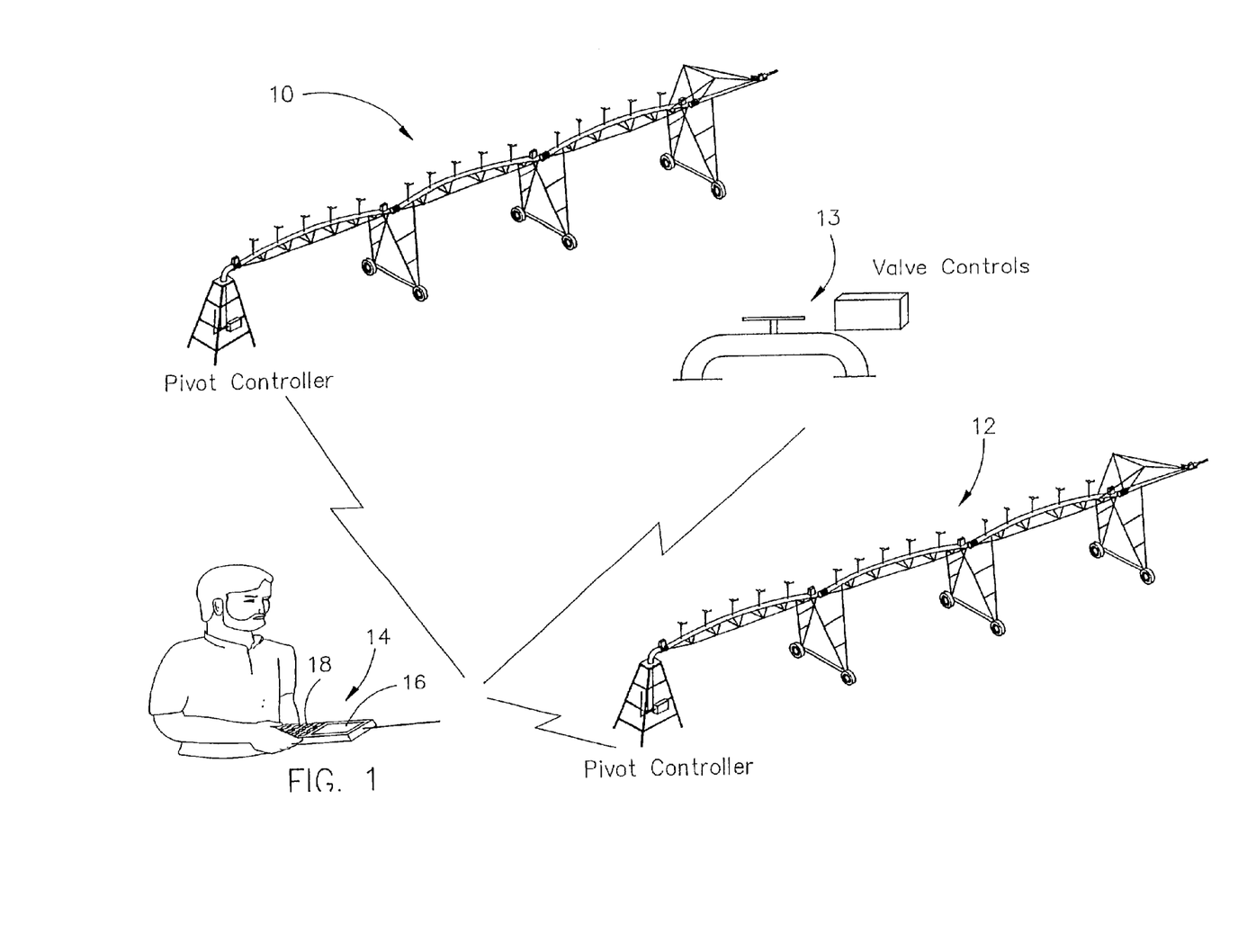
FIG. 1 illustrates the RUI of this invention being employed by a user to read the status of irrigation components and ancillary equipment to enable the user to control the operation thereof.

In an effort to overcome the shortcomings of the base station control systems and the remote mount control panels of the prior art, a remote user interface (RUI) 14 is provided which includes a display 16 and an optional keypad 18, as seen in FIG. 1. The RUI is a handheld device to enable the user to utilize the same in a convenient manner. The RUI 14 has the capability of communicating with and controlling the irrigation components and ancillary equipment using conventional wireless telemetry technology. Through the use of the RUI 14, the user may remotely read or determine the status of, communicate with, and control the irrigation components and ancillary equipment from any location, without requiring the user to be at the irrigation component controls or at a specific location in the field.

The RUI 14 can be comprised of one or more components that are operatively connected to one another. One such component could be a personal digital assistant (PDA) or similar portable hand-held computer of a compact size. The technology base of the PDA will be useful for storing information relating to the various irrigation components and ancillary equipment. The PDA can further serve to host software that is operative on the RUI 14 for receiving and interpreting status information from the irrigation components and ancillary equipment. This same software is further provided to receive control commands from the user and transmit the same to the irrigation controls.

Figure 2:
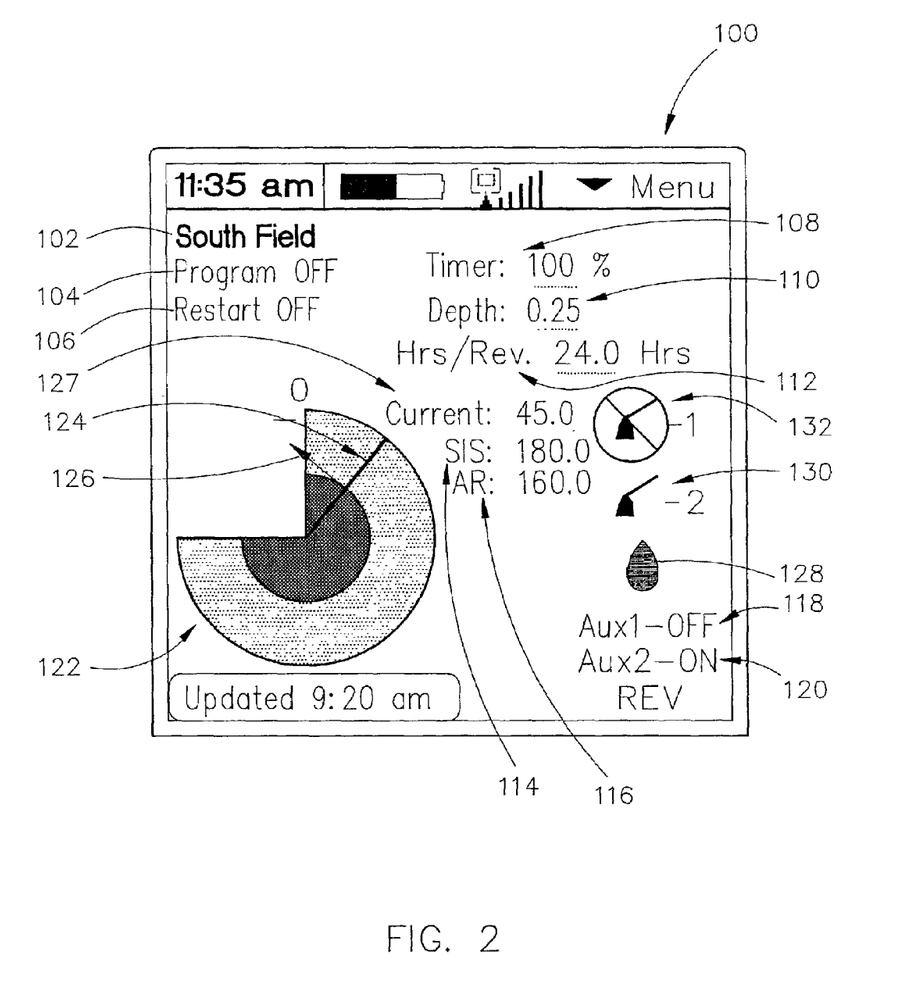
FIG. 2 illustrates a possible embodiment of a single display screen that provides the user with a plurality of system status information at a single glance.

In a preferred embodiment, the software stored by the RUI is capable of generating one or more screens of compiled information. The information is displayed to the user on the display 16 in the form of one or more graphical user interfaces (GUIs). FIG. 2 depicts an example of a screen 100 displaying a plurality of GUIs. The GUIs are preferably shaped to represent a specific piece of equipment or an aspect of the operational status of the system or a piece of equipment. The screen 100 preferably displays text GUIs to relay basic information. For example, the field name GUI 102 identifies the particular field that the irrigation system is located. A program status GUI 104 indicates to the user that the irrigation program is "active" or "off." Where a particular system is provided with a system restart function, a restart status GUI 106 can be provided.

A percent timer GUI 108 can be provided to indicate the percent timer setting of the system. Where it is desired to run the irrigation system to obtain a specific water depth, a water depth GUI 110 can be provided. An hours/revolution GUI 112 can also be provided to indicate the programmed hours per revolution of the system. Where a particular irrigation system is provided with a "stop in slot" function, a stop in slot GUI 114 can be provided that identifies the programmed stop in slot position. An automatic reverse or stop GUI 116 can be provided to set a specific point in the operation of the pivot for the pivot to reverse direction or to stop the operation. If one or more pieces of auxiliary equipment, such as a pump, are being used, auxiliary equipment status GUIs 118 and 120 can be selectively provided to indicate whether the auxiliary equipment is on or off.

It is contemplated that non-text GUIs can also be provided to present status information to a user. A pivot GUI 122 can be provided in the shape of a circle or a partial circle to indicate the degree of rotation that the pivot is programmed to operate. The pivot GUI 122 is shown with approximately one-quarter of the circle being deleted, indicating that the subject pivot will only pivot in a 270-degree path. A line 124 or textual GUI 125 can be added to the pivot GUI 122 to indicate the current position of the pivot along the pivot path. An arrow 126 can also be added to the pivot GUI 122, extending generally perpendicularly from the line 124 to indicate whether the pivot is rotating in a clockwise or counter clockwise direction.

It is contemplated that a system of color-coding could be incorporated into the pivot GUI 122 to further indicate additional status information. For example, the pivot GUI 122 could be depicted in blue when the pivot is running wet, green when the pivot is running dry, orange when the pivot is running in a chemigation mode and gray when the pivot is stopped. Different colors and combinations of colors can be utilized to fit the needs of the user. A symbol such as a water drop 128 could be provided to indicate that the system is operating in a water "on" mode, whereas a water drop with a strike-through symbol (or no water drop shown at all) may indicate that the system is operating in a water "off" mode. Where one or more end-guns are used with a pivot, end-gun GUIs 130 and 132 can be provided to indicate their status. The end-gun GUI 130 is shown in an "on" depiction in FIG. 2, whereas end-gun 132 is shown in an "off" depiction.

Figure 3:
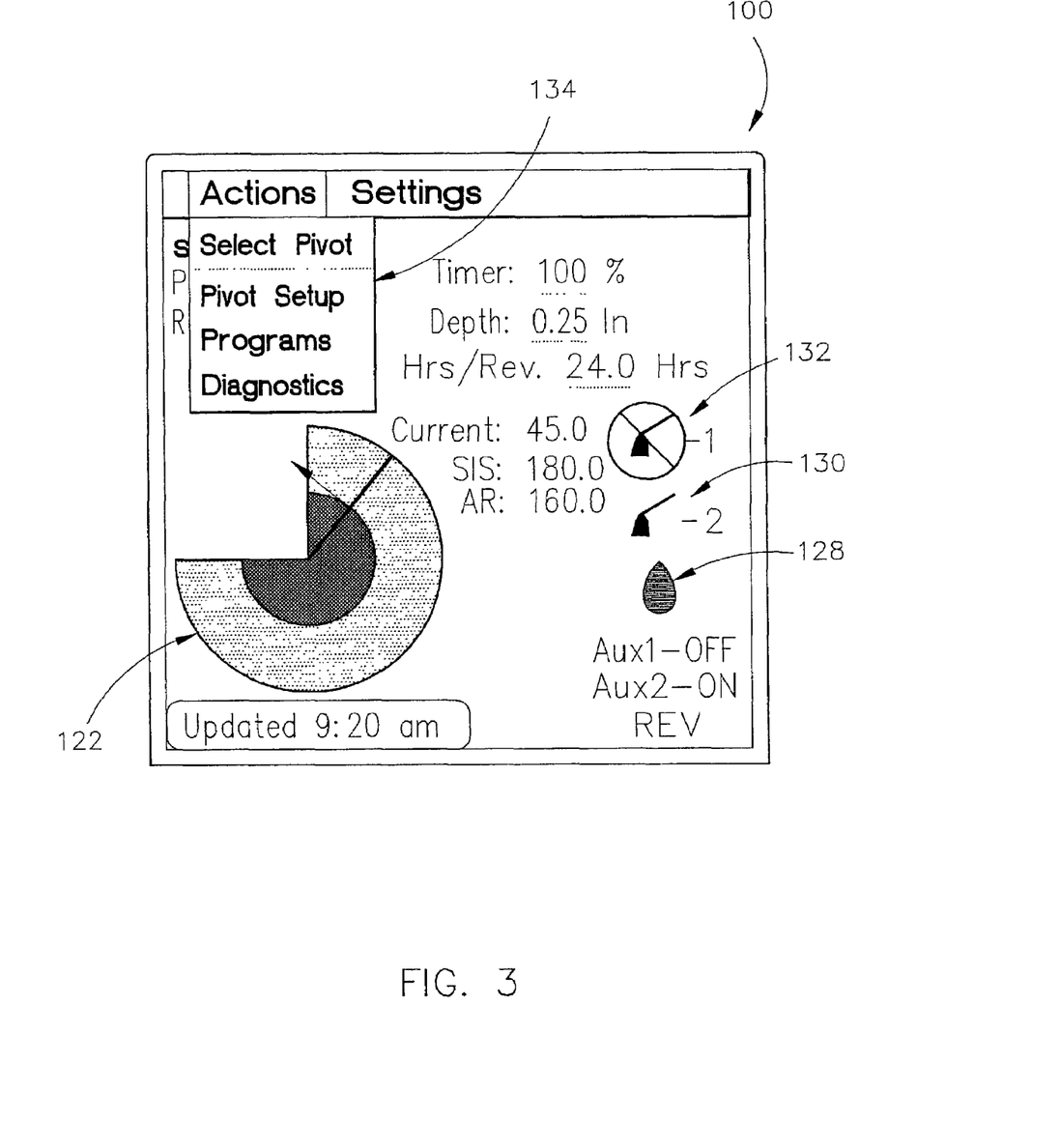
FIG. 3 illustrates a possible embodiment of a drop-down menu that could be used in connection with the display screen of FIG. 2.
Figure 6:
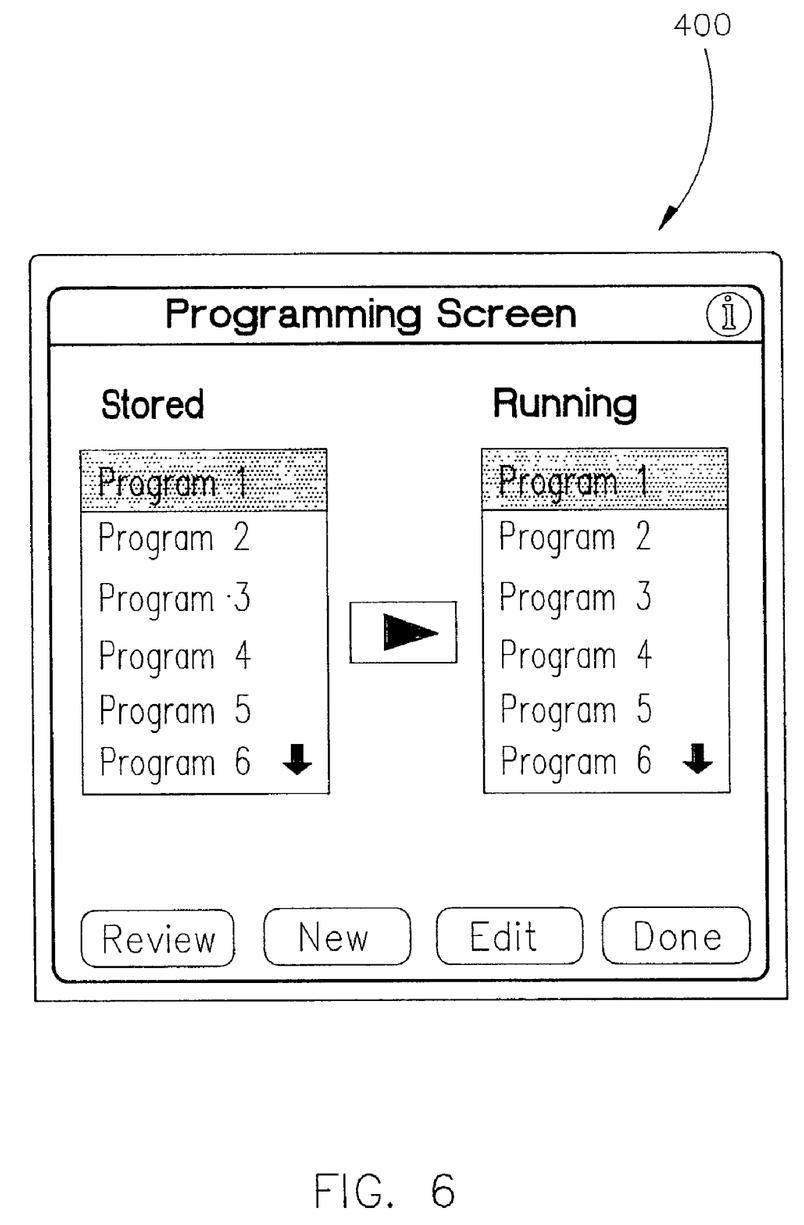
FIG. 6 illustrates a possible embodiment of a programming screen that allows a user to review, modify or create programs for a selected system to perform.
Figure 7:
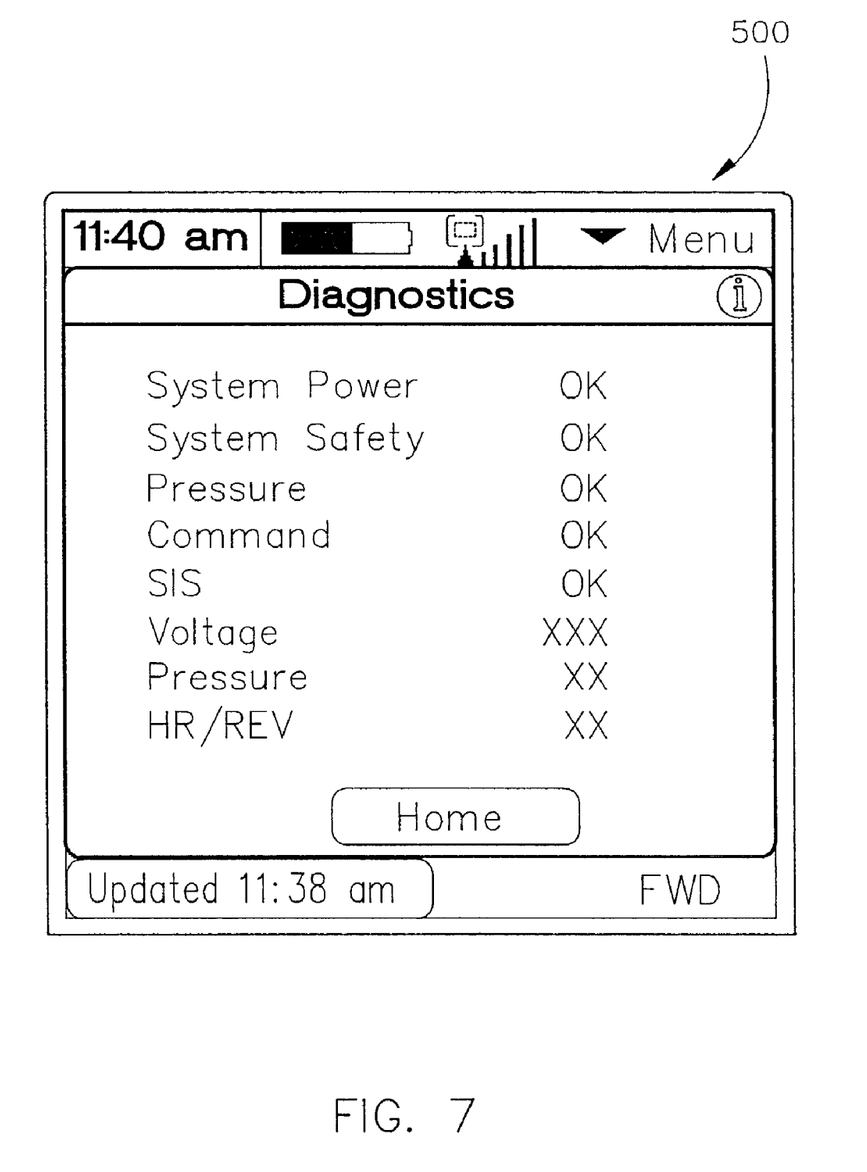
FIG. 7 illustrates a possible embodiment of a diagnostics screen that allows a user to view the operational status of the components in a system at a single glance.

Each of the GUIs can be individually selected by the user to control the operation of the irrigation equipment represented by the GUI. Using either a touch sensitive display 16 or a keypad 18, the user selects the GUI and changes its status. The RUI 14 then transmits the command to the equipment, changing its operational status accordingly. A menu 134, a possible embodiment of which is shown in FIG. 3, can be selected to change the information shown on the display 16. The menu 134 shown in FIG. 3 allows the user to select a screen for altering the pivot setup (FIGS. 4 and 5), a programming screen 400 for selecting a program (comprising a plurality of user-defined control commands) to be run by the system (FIG. 6), or a diagnostic screen 500 (FIG. 7) to monitor the operational values of system components. When any of the operational values do not fall within a previously defined operational range, the software can display an alarm or otherwise warn the user accordingly.

Figure 4:
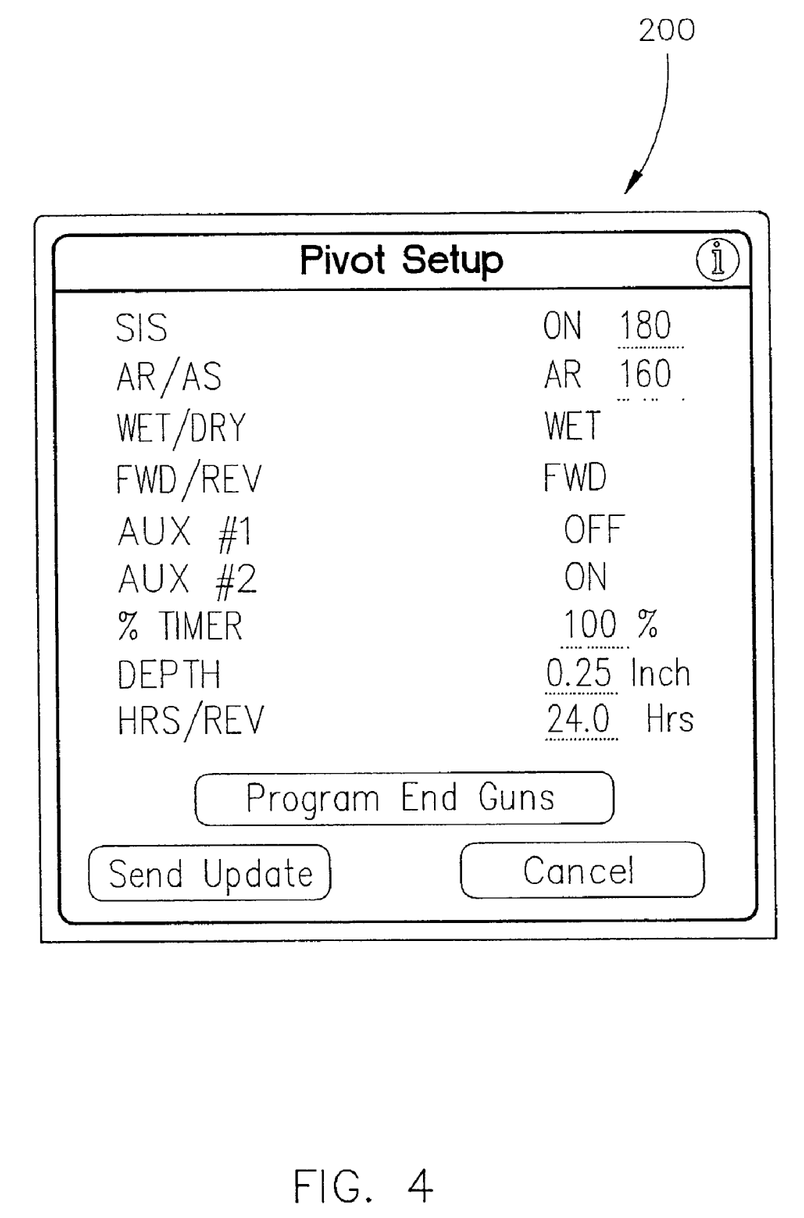
FIG. 4 illustrates a possible embodiment of a pivot set up screen that allows a user to control a plurality of operational values for a system.
Figure 5:
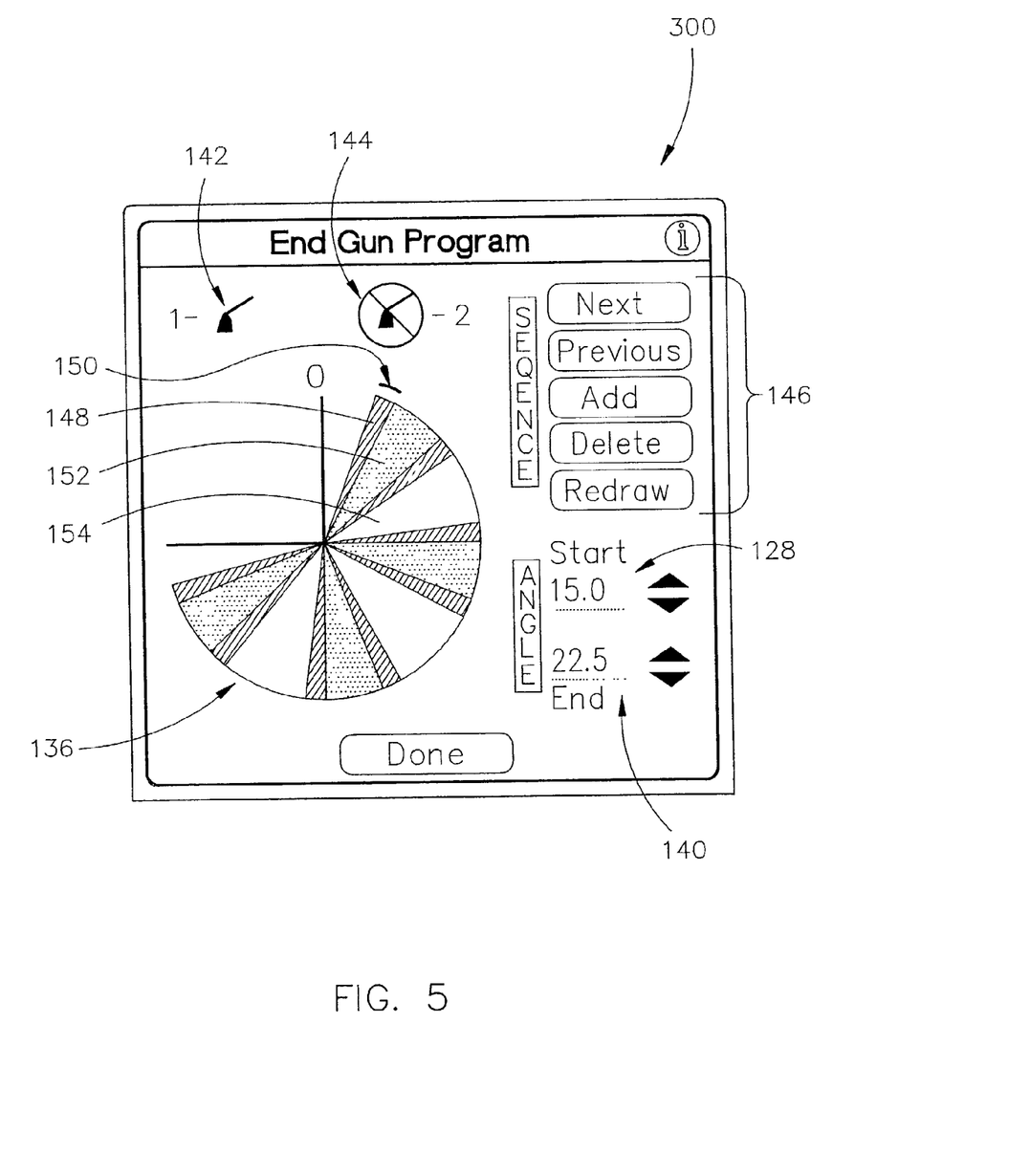
FIG. 5 illustrates a possible embodiment of an end-gun program screen that allows a user to control a plurality of operational values for a spray pattern of a selected piece of equipment.

A preferred embodiment of a pivot setup screen 200 is shown in FIG. 4. The pivot setup screen should preferably display the settings for a particular pivot. The particular embodiment of pivot setup screen shown in FIG. 4 allows the user to selectively display an end-gun program screen. A preferred embodiment of such an end-gun program screen 300 is shown in FIG. 5. A pivot GUI 136 is provided that depicts detailed information relating to the operation of a center pivot and the pair of end-guns being used in this example. The pivot GUI 136 is preferably depicted the shape of a circle or a partial circle to indicate the degree of rotation that the pivot is programmed to operate. The pivot GUI 136 shown in this example is shown with approximately one-quarter of the circle being deleted, indicating that the subject pivot will only pivot in a 270-degree path.

The pivot GUI 136 can be selectively partitioned into a plurality of wedges, which represent different pivot end-gun settings along the pivot path. Each wedge can be selected individually by the user and changed as desired. For example, the pivot GUI 136 shown in FIG. 5 shows a wedge section 148 that has been selected by the user. A highlighting arc 150 is provided adjacent the wedge 148 to identify it as the selected wedge. With the wedge selected, the user is able to determine the pivot end-gun settings for that particular portion of the pivot path. An angle start GUI 128 and an angle end GUI 140 are provided, which allow the user to determine the exact location of the starting and ending positions of the particular wedge. Here, the user has defined the boundaries of the wedge 148 to start at 15 degrees and end at 22.5 degrees (0 degrees being indicated at the top of the pivot GUI 136). A pair of end-gun GUIs 142 and 144 are provided to allow the user to selectively determine whether or not one or both of the end-guns are be turned "on" or "off" for a given wedge of the pivot path. In the present example, the first end-gun is on and the second end-gun is off when the pivot travels through the wedge 148.

Different colors or patterns can be used to shade each wedge to depict the particular spray pattern chosen for each wedge. For example, the wedge portion 148 is shown in cross-hatching, which in this example indicates that the first end-gun is on and the second end-gun is off. The wedge portion 152 is shown in a speckled pattern, which in this example indicates that the first end-gun is off and the second end-gun is on. The wedge portion 154 is blank, which in this example indicates that both the first end-gun and the second end-gun are off. A series of sequence GUIs 146 are preferably provided to allow the user to add, delete, and otherwise modify each of the wedge portions of the pivot GUI 136 as desired.

The user has the ability to customize the screens displayed by the RUI 14 to accurately depict the particular piece of irrigation equipment that is being controlled. A main screen setup screen 600 (FIG. 8) is provided that can be selectively displayed by the user. With the main screen setup screen 600, the user can define the information and structural elements he wants to see on the remaining screens. It is preferred that the user be able to define the information displayed based on the structural characteristics of the equipment as well as the manner in which the user prefers to read the status of and control the equipment. It is also preferred that the main screen setup screen 600 be unique for each piece of equipment that is interfaced with the RUI 14. For example, if a pivot has only one end-gun installed, the user would select only the End Gun 1 GUI 156 from the main screen setup screen 600. Once the selection is made, the main control screens (FIG. 2 and FIG. 5) would show only one end gun. Similarly, if the user controls his irrigation by "Depth" or "Hours/Revolution," he would configure FIG. 2 and FIG. 4 to only show "Depth" or "Hours/Revolution" by selecting the depth GUI 158 or hrs/rev GUI 160 in the main screen setup screen 600. An aux 1 GUI 162 and an aux 2 GUI 164 can also be provided to accommodate possible auxiliary equipment being used.

Figure 8:
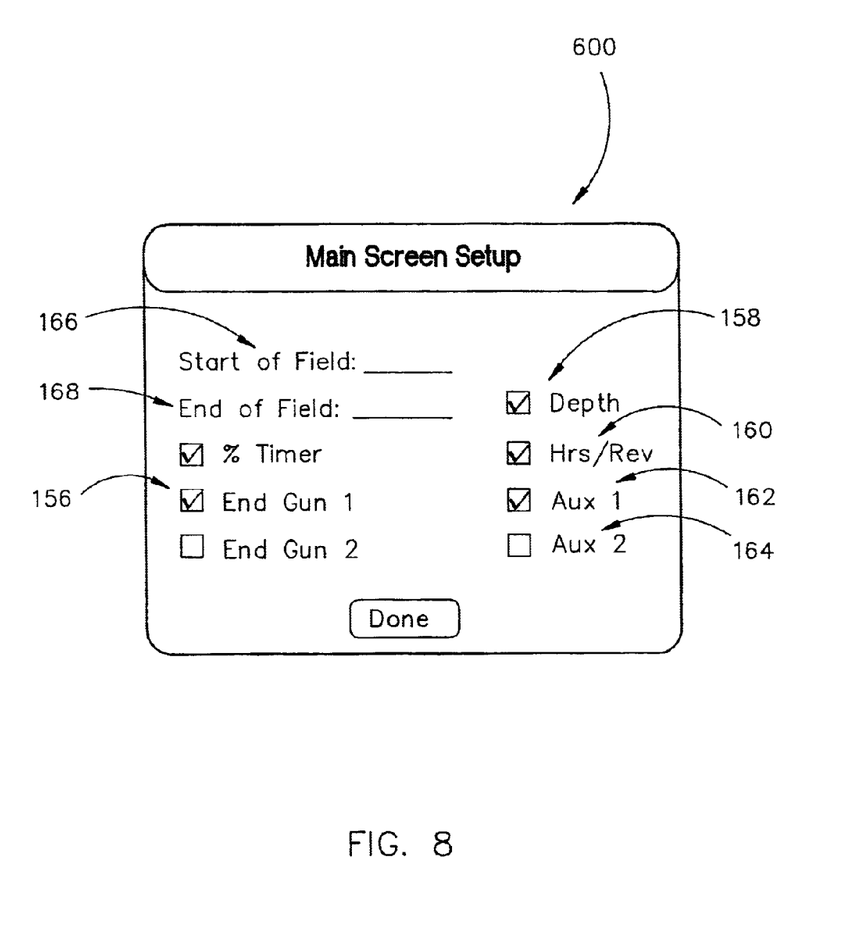
FIG. 8 illustrates a possible embodiment of a setup screen that may be used to customize other display screens used with the RUI.

The user can also customize the geographic representation of the field being irrigated by designating the start angle and end angle of the field. For example, if the pivot only irrigates three-quarters of a field because of an obstacle located in the remaining one-quarter of the field or other reason, the user can customize the screens to show the actual portion of the field that is under control. The user would simply input the start angle and end angle of the field in the start of field GUI 166 and end of field GUI 168.

The prior art does not allow this customization. For example, if the maximum number of end-guns that can be installed on a piece of equipment machine is two, the controls would show two end guns. However, for the operator with no end-guns installed on his equipment, he would be required to remember that no end-guns are installed and ignore the end-gun status being reported.

To enable the RUI 14 to exchange information with the irrigation components and ancillary equipment, the PDA is preferably coupled with wireless telemetry technology, such as RF telemetry or cell phone telemetry. It is contemplated that the PDA and wireless telemetry technology could be combined into a single integrated RUI 14 such as the Sprint TP3000, Kyocera 6035, Samsung 1300, or similar device that would enable the user to monitor and control the subject equipment from virtually anywhere. It is further contemplated that the RUI 14 could be comprised of a PDA that is interfaced with a cellular or digital telephone using an interface cable. Additionally, it is contemplated that the RUI 14 could be comprised of a PDA that is interfaced with a VHF/UHF or spread spectrum radio using an interface cable.

Thus, it can be appreciated that if the user visits a site wherein an irrigation system is located, and visually determines that the system is functioning improperly, the user may use the RUI 14 to determine the status of, communicate with, and control the irrigation components of the system from any location in the field. Further, depending upon the range of the RUI, the user could determine the status of, communicate with, and control the irrigation components from a location other than in or adjacent to the field.

In the drawings and in the specification, there have been set forth preferred embodiments of the invention; and although specified items are employed, these are used in a generic and descriptive sense only and not for purposes of limitation. Changes in the form and proportion and arrangement of parts, as well as substitute of equivalents, are contemplated as circumstances may suggest or render expedient without departing from the spirit or scope of the invention as further defined in the following claims.

Thus it can be seen that the invention accomplishes at least all of its stated objectives.

We claim:

1. A remote user interface for reading the status of and controlling irrigation equipment, comprising:
   a hand-held display;
   a processor;
   wireless telemetry means for transmitting signals and data between the remote user interface and the irrigation equipment; and
   software operable on said processor for:
   (a) displaying data received from the irrigation equipment as a plurality of GUIs that are configured to present said data as status information on said display;
   (b) receiving a user's commands to control the irrigation equipment, through said user's manipulation of said GUIs; and
   (c) transmitting signals to the irrigation equipment to control the irrigation equipment in accordance with said user's commands.

2. The remote user interface of claim 1 wherein said wireless telemetry means is comprised of a cellular telephone.

3. The remote user interface of claim 1 wherein said wireless telemetry means is comprised of a digital telephone.

4. The remote user interface of claim 1 wherein said wireless telemetry means is comprised of a spread spectrum radio.

5. The remote user interface of claim 1 wherein said wireless telemetry means is comprised of a VHF/UHF radio.

6. The remote user interface of claim 1 wherein said software is further operative on said processor for displaying said irrigation equipment status information as a plurality of GUIs that are shaped to identify particular types of irrigation equipment.

7. The remote user interface of claim 6 wherein said plurality of GUIs are selectively displayed on a single screen on said display.

8. The remote user interface of claim 6 wherein said plurality of GUIs are selectively displayed on a plurality of individual screens.

9. The remote user interface of claim 8 wherein said plurality of individual screens are interlinked with one another to allow a user to navigate between and selectively display the same.

10. The remote user interface of claim 6 wherein said plurality of GUIs are shaped to identify operating irrigation patterns for specific irrigation equipment.

11. The remote user interface of claim 10 wherein said software is further operative on said processor to change the shape of said plurality of GUIs change in response to a change in the status of the irrigation equipment.

12. The remote user interface of claim 6 wherein said plurality of GUIs are color-coded to identify specific irrigation equipment status information.

13. The remote user interface of claim 12 wherein said software is further operative on said processor to change the color of said plurality of GUIs change in response to a change in the status of the irrigation equipment.

14. The remote user interface of claim 1 wherein said software is further operative on said processor to execute one or more programs comprising a plurality of user defined irrigation control commands.

15. The remote user interface of claim 1 wherein said software is further operative on said processor to monitor the operational status of said irrigation equipment and warn a user when said operational status does not fall within a previously defined operational status range.

16. A device for reading the status of and controlling irrigation equipment, comprising:
 a single, hand held remote user interface, having at least:
  (a) wireless telemetry means for transmitting data between the remote user interface and the irrigation equipment;
  (b) means for displaying data received from the irrigation equipment as a plurality of GUIs that are shaped to identify the type of irrigation equipment and the operational characteristics of the irrigation equipment; and
  (c) means for directly controlling the irrigation equipment in accordance with commands received from a user.

17. The method of remotely determining the status of and controlling irrigation equipment, comprising the steps of:
 providing a single handheld RUI comprising a display and wireless telemetry means for receiving and transmitting data between the remote user interface and the irrigation equipment;
 displaying graphic user interfaces on said RUI to enable a user to determine the status of the irrigation equipment; and
 manipulating said graphic user interfaces to directly control the operation of the irrigation components and ancillary equipment.

18. A remote user interface for reading the status of and controlling irrigation equipment, comprising:
 a hand-held display;
 a processor;
 wireless telemetry means for transmitting signals and data between the remote user interface and the irrigation equipment; and
 software operable on said processor for:
  (a) displaying data received from the irrigation equipment as a plurality of GUIs that are configured to present said data as status information on said display and shaped to identify particular types of irrigation equipment;
  (b) receiving a user's commands to control the irrigation equipment, through said user's manipulation of said GUIs to change the appearance of said GUIs so that said GUIs portray specific operational characteristics of the irrigation equipment represented by said GUIs; and
  (c) transmitting signals to the irrigation equipment to control the irrigation equipment in accordance with said users commands.

\* \* \* \* \*